April 26, 1966  J. S. GOLIGHTLY  3,248,200

BENDING GLASS SHEETS

Filed June 18, 1962  3 Sheets-Sheet 1

INVENTOR.
JAMES S. GOLIGHTLY
BY
Oscar H. Spencer
ATTORNEY

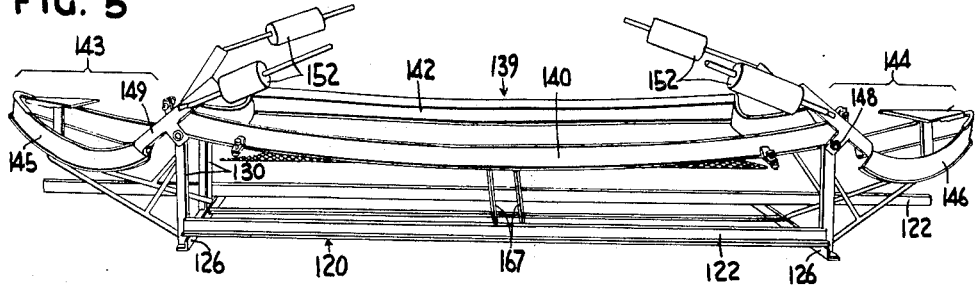
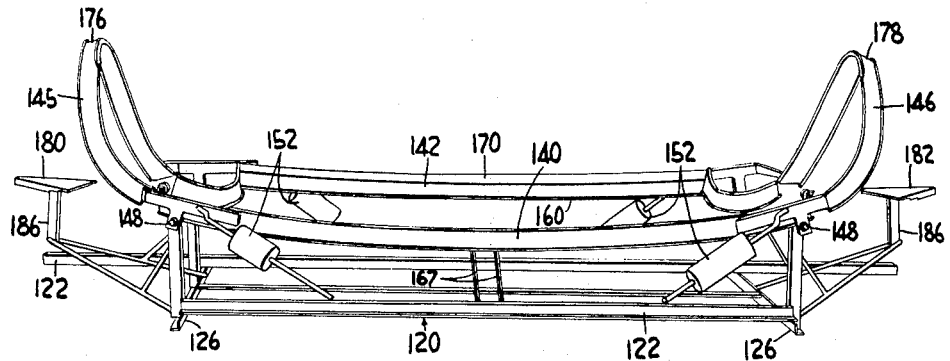
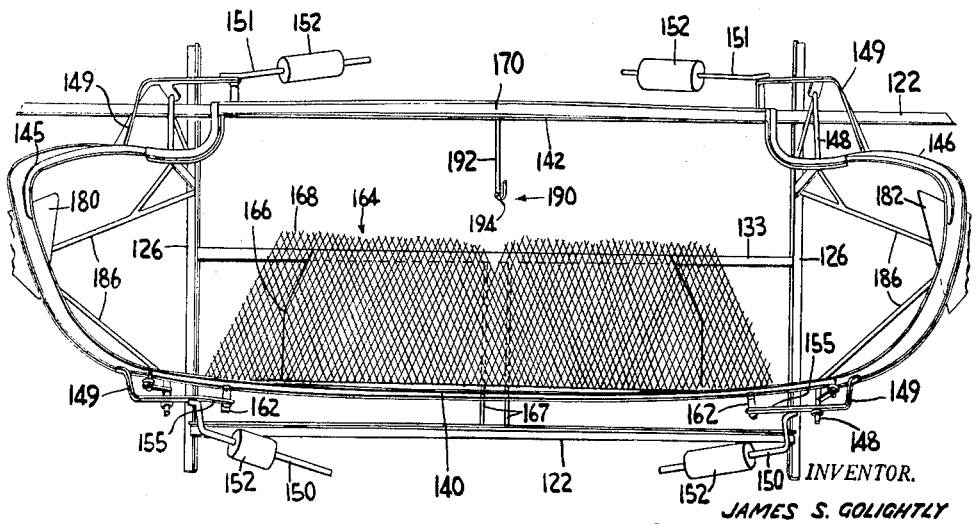
INVENTOR.
JAMES S. GOLIGHTLY
BY Oscar L. Spencer
ATTORNEY April 26, 1966  J. S. GOLIGHTLY  3,248,200
BENDING GLASS SHEETS Filed June 18, 1962 3 Sheets-Sheet 3

INVENTOR
JAMES S. GOLIGHTLY

Oscar H Spencer
ATTORNEY

United States Patent Office 3,248,200
Patented Apr. 26, 1966

3,248,200
BENDING GLASS SHEETS
James S. Golightly, Fox Chapel, Pa., assignor to Pittsburgh Plate Glass Company, Pittsburgh, Pa., a corporation of Pennsylvania
Filed June 18, 1962, Ser. No. 203,191
8 Claims. (Cl. 65—290)

This application is a continuation-in-part of application Serial No. 649,208, filed March 28, 1957, now abandoned.

The present invention relates to bending glass sheets, and more specifically relates to method and apparatus for bending glass sheets into compound curves including a longitudinal bend having a relatively gently bent central portion merging into regions of severe bends to form opposed longitudinal extremities extending substantially parallel to each other and also including one longitudinally extending side portion bent transversely relative to the gently bent central portion.

Prior to the present invention, it had been considered necessary to complicate the structure of glass bending molds in order to produce compound curvature from flat glass sheets, particularly the type of compound curvature that was introduced into the windshields of certain 1957 model automobiles. Certain automobile windshields require a local transverse bend in addition to the wrap-around bends of previous models wherein they extend in a continuous sweep from one side of the automobile completely across the front and around to the other side of the automobile. The transversely bent portion extends into the front of the automobile roof.

In the manufacture of such complexly curved windshields, it was previously considered necessary to utilize bending molds having many moving parts or provided with electrical heating elements or having both types of such structural elements easily damaged in use to fabricate the transverse bend. Simplifying the bending mold structure minimizes mold maintenance problems and facilitates the manufacture of compound bends. The present invention provides a simplified bending mold requiring minimum maintenance for producing such bends.

The present invention will be better understood after studying various illustrative embodiments which are described below. In the accompanying drawings, which form part of the description, like reference numerals refer to like structural elements. It is understood that this description is for purposes of illustration rather than limitation, reference to the latter being obtained from the appended claims.

In the drawings forming part of the present invention,

FIGURES 5, 6 and 7 are views similar to FIGURES 1, 2 and 3 of an alternate embodiment of the present invention.

Figure 1:
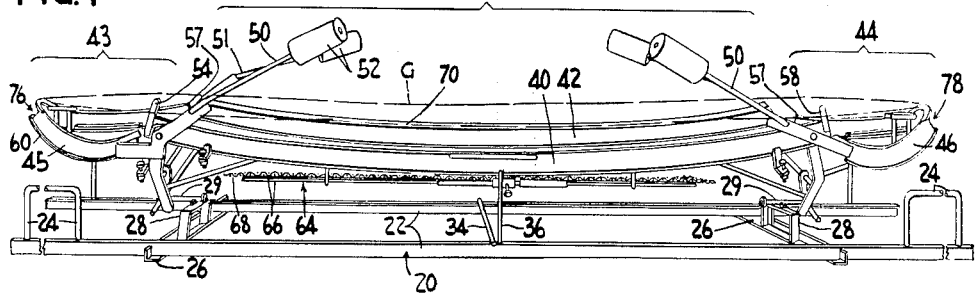
FIGURE 1 is an elevational view, partly in perspective, of one embodiment of a glass sheet bending mold exemplifying the present invention in the open position preparatory to receive a glass sheet.
Figure 2:
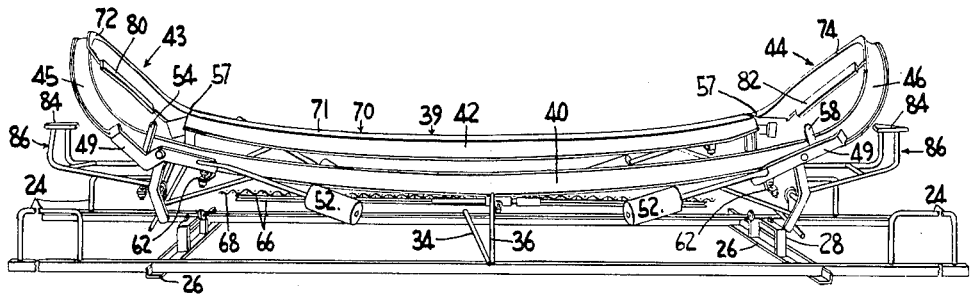
FIGURE 2 is a view similar to FIGURE 1 showing the mold in its closed position forming a continuous frame whose upper shaping surface conforms in outline and elevation to the contour desired for the margins of the bent glass sheet.
Figure 3:
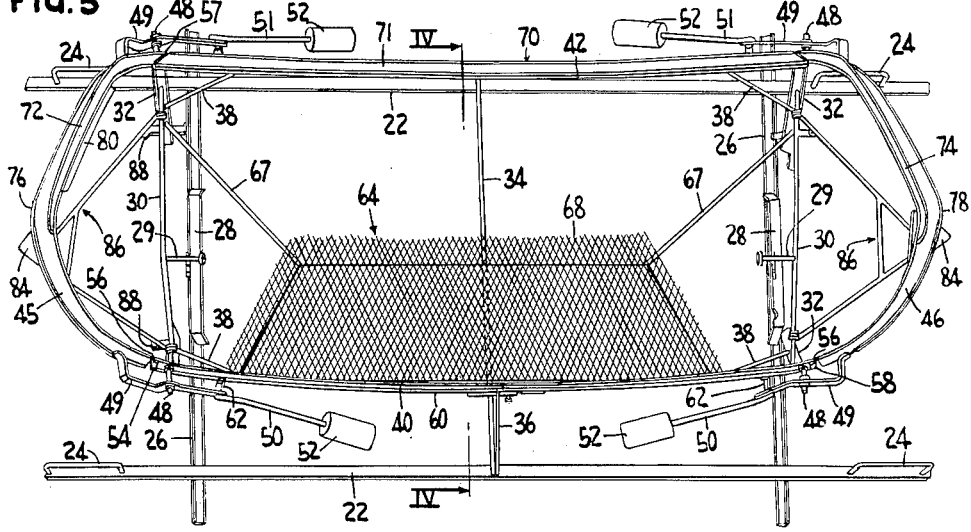
FIGURE 3 is a plan view partially in perspective of the mold as seen in FIGURE 2.

Referring specifically to FIGURES 1 through 4, reference number 20 shows a carriage frame which comprises a pair of spaced longitudinally extending angle irons 22 having handles 24 of inverted U-shape extending upwardly from the angle iron extremities. The longitudinal angle irons 22 are interconnected by transverse angle irons 26. A support bracket 28 is carried by each transverse angle iron for securing a stub rod 29 which is used to carry a support rod 30. The latter is connected at its extremities to angle braces 32 (FIGURE 3). A cross rod 34 interconnects the longitudinal angle irons 22 centrally thereof. A bracing rod 36 extends upwardly at an angle from angle iron 22. Additional bracing rods 38 extend angularly upwardly and inwardly from support rods 30.

Angle braces 32 and bracing rods 36 and 38 are all connected to the center mold section 39 of the bending mold carried by the carriage frame 20. The center mold section 39 comprising a pair of longitudinally extending spaced center rails 40 and 42 spaced from one another laterally of the mold a distance slightly less than the width of the bent glass sheet and end mold sections 43 and 44 comprising end section rails 45 and 46 pivoted relative to the central mold section 39 such as in present conventional sectionalized skeleton molds utilized to produce wrap-around bends.

Each of the rails 40, 42, 45 and 46 have upper surfaces extending the length thereof. Each upper surface has a transverse dimension extending from an upper inner corner where the shaping surface meets the inner wall of the rail to an upper outer corner where the shaping surface meets the outer wall of the rail. The upper surfaces of the rails form an outline shaping surface when the end section rails are pivoted toward the center mold section. In this closed mold position, the inner ends of the end section upper shaping surfaces form continuations of the shaping surfaces at each end of the center section rails.

In order to rotate the end sections 43 and 44 relative to the center section 39, stub hinges 48 are attached to the center section rails 40 and 42 adjacent their extremities and the end section rails 45 and 46 are extended inwardly to form metal straps 49 which terminate in lever arms 50 and 51. The straps 49 are journaled in the stub hinges 48 for rotation therewith. Counterweights 52 at the inboard extremities of the lever arms cause the lever arms and end mold sections to rotate from the open position depicted in FIGURE 1 to the closed position of FIGURE 2. This tendency for the end mold sections 43 and 44 to rotate into the closed mold position is inhibited by the mass of the flat glass sheet G resting on the open mold until the glass sheet is softened during the bending operation.

Fingers 54 and 58 are attached adjacent the longitudinal extremities 56 of rail 40 to abut the side edge of the glass sheet. These fingers guide the transverse alignment of the glass sheet on the mold during the bending operation. It is preferred to cover the fingers with a facing 59 (FIG. 4) of a material that does not harm the glass sheet edges at elevated temperatures. Asbestos, glass fiber cloth, etc., are preferred for such facing.

Each of the mold rails 40, 42, 44 and 46 are provided with a reinforcing flange 60 at its bottom extremity for reinforcement purposes. Such structure lessens the cross bracing needed to reinforce the mold.

Stops 62 are attached to the center mold section 39 to stop the rotation of the end mold sections 43 and 44 when the outline desired for the bent glass sheet has been attained. The stops are located for contact by either the straps 49 or the arms 50 or 51 when the end mold sections have rotated sufficiently to the desired closed mold position.

A heat abstractor member 64 is provided in the region underlying the portion of the glass sheet that is desired to be maintained relatively flat. Member 64 has a high heat capacity to absorb heat from the vicinity of the overlying portion of the glass sheet to prevent the latter from softening at times other glass sheet portions attain glass softening temperatures.

The heat abstractor 64 for the central mold section 39 comprises a plurality of layers of material including one or more metal plates 66 supported from the support rods 30 by means of additional support rods 67. A metal screen or an expanded metal plate 68 having an area greater than that of the underlying metal plate 66 is attached immediately above the latter so that its inboard marginal area is unsupported and extends laterally beyond the innermost lateral edge of the metal plates 66. The purpose of the unsupported mesh screen portion is to provide a graduation in the pattern of the heat selectively abstracted from the overlying glass sheet, thus minimizing thermal shock between adjacent areas of the glass sheet subjected to selective heat abstraction and free from heat abstraction. In other words, heat absorber member 64 comprises a relatively massive portion of air impervious material coextensive in area with the solid metal plate 66 adjacent center section rail 40 and a relatively light portion of a perforated material coextensive in area with the peripheral portion defined by the marginal area of the metal screen or expanded metal plate 68 located beyond a portion of the periphery of the solid metal plate 66.

Spaced outboard of the upper outer corner of the upper surface of rail 42 which is designed to support the bent sheet adjacent its edge bordering the transversely curved portion is a continuous slide bar 70 having a highly polished upper glass supporting surface 71. Slide bars 72 and 74 are spaced outboard of the upper outer corner of the upper surfaces of the end section rails 45 and 46, respectively, to embrace portions of the latter. Each latter slide bar extends from an inboard extremity 57 of an end section rail 45 or 46 around a mold extremity 76 or 78 to terminate slightly inboard of the latter.

The slide bars 70, 72 and 74 extend obliquely upwardly and outwardly of the portion of the contour defined by the rail encompassed by the slide bar and are sufficiently thick to provide a rigid support for the portion of the periphery of the flat glass sheet that slides thereon. Each rail is shaped to conform longitudinally to a portion of the outline of the bent glass sheet and in transverse section to be tangent to the under surface of the bent glass sheet.

Figure 4:
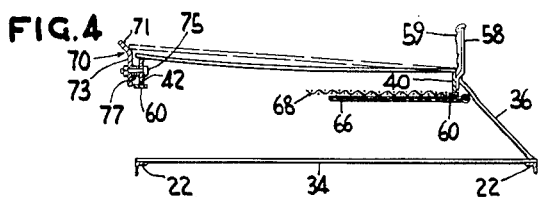
FIGURE 4 is a fragmentary view taken sectionally across the lines IV—IV of FIGURE 3 showing the curved glass sheet resting on the mold, with the relative position of the flat glass sheet shown in phantom.

The inboard extremities of each of the slide bars 70, 72 and 74 are spaced in slight distance from the frame defined by the upper shaping surfaces of mold rails 40, 42, 45 and 46 for reasons to be discussed later. A typical construction for attaching a slide bar in spaced relation to its adjacent mold rail is shown in FIGURE 4.

Slide bar 70 comprises an outwardly and obliquely upward extending portion whose upper surface 71 supports the bottom corner of the longitudinal side edge portion of the supported glass sheet in sliding relation, and a vertical slotted flange 73 bent from the slide portion. Rail 42 is apertured so that it can be secured to the slide bar by means of a nut and bolt 75 extending through the slotted flange and the mold rail aperture. A spacer sleeve 77 surrounds the bolt between the vertical slotted flange 73 and the mold rail 42.

In a typical mold wherein the glass edge overlaps the outside edge of the frame defined by the mold rails by $\frac{1}{16}$ inch, a spacer of $\frac{1}{8}$ inch thickness is used. Also, the bottom of the smoothly polished surface 71 of the slide bar 70 is adjusted in position so that its lowermost portion is on the order of $\frac{1}{8}$ inch above the level of the shaping surface provided by the mold rails. While only one slide bar has been shown attached in spaced relationship to its adjacent mold rail, it is understood that it is preferred that the slide bars 72 and 74 be spaced from the end section rails 45 and 46 in like manner.

The purpose of providing the obliquely disposed slide bars outboard of the half of the bending mold margin is to insure proper sliding of the flat glass sheet into the bent configuration by virtue of minimizing the friction between glass and metal. The slide bar for the center section rail 42 enables the side edge portion laterally outboard of the region to be bent transversely with its bottom corner extending along the side behaving as a fulcrum line about which the sheet sags transversely. This side slides along the surface 71 until the sheet engages the rail 42 with its margin overlapping the rail.

Slides 72 and 74 permit the extremities to slide both transversely and longitudinally as the end mold sections are rotated into the closed mold position thus forcing the glass sheet extremities to assume their desired configuration. The leverage action of the glass edge on the slide is particularly important in providing a transverse bend in those regions where the glass sheet is given its most severe longitudinal bends. Unless the slide bars are smoothly surfaced, the portions of the glass sheet resting thereon are likely to wrinkle during sliding and form an uneven appearance similar to the scalloped edge of a pie crust.

The particular pattern to be fabricated by the mold depicted in FIGURES 1 through 3 requires each extremity to have an absolutely flat portion adjacent one lateral extremity. Therefore, in order to provide the necessary flat lateral extremities, abstractors 80 and 82 are attached to the inboard extremity laterally inboard of the end section rails 45 and 46 in addition to the usual heat abstractors 84 carried by A-frames 86 for decelerating the heating cycle for the tips of the glass sheet. Stop members 88 are attached to the support rods 30 to provide a stop supporting the A-frames when the additional abstractors 84 are in their proper position beneath the mold shaping surface.

As partly shown in FIGURE 4, the flat glass sheet is initially supported partially along one side by the smoothly polished surface 71 of the slide bar 70 and also in supported intermediate its longitudinal extremities at the outboard extremities of the center molding rails 40 and 42. The end mold sections 43 and 44 support the tips of the flat glass sheet by means of slide bars 72 and 74 at the mold extremities 76 and 78 which serve as glass tip support means.

The flat glass sheet rests with one longitudinally extending side edge contacting the fingers 54 and 58 which are spaced laterally outboard of the mold carrying center section rail 40 adjacent its extremities 56. These fingers prevent lateral movement of the glass relative to the mold except for the longitudinal side edge portion of the glass sheet resting upon surface 71 of the slide bar 70. Thus, one longitudinal side edge of the flat glass sheet is located slightly beyond the center section rail 40, while its other longitudinal side edge is located laterally beyond the center section rail 42.

When flat glass is prepared for bending, it is mounted to rest as a beam on the slide bars 72 and 74 at mold extremities 76 and 78, slide bar 70 and rail extremities 56 with one side edge resting against fingers 54 and 58. The latter are located to contact the glass edge at points of minimum vertical displacement for the glass sheet. Rail extremities 56 must lie in a common plane with slide bars 72 and 74 when the mold occupies the spread mold position to enable the flat glass sheet to rest as a beam thereon. In order to do this the straight distance between the slide bar portions intersecting said common plane in the spread mold position must be substantially equal to the curved length of the mold in the close mold position.

As the glass and the mold are passed through a bending lehr where they are subjected to elevated temperatures until the glass softening temperature is reached, the extremity portions of the softening glass sheet above the end mold sections 43 and 44 are folded upwardly by rotation of the latter and the tips of the glass slide upon the slide bars 72 and 74. The portion of the glass sheet immediately above the abstractor 64 is maintained relatively flat and the opposite side initially supported on the smooth surface 71 slides downwardly to provide a transverse curve extending parallel to the slide bar 70 and adjacent thereto.

When the glass sheet bends into the compound curvature desired, both its longitudinal dimension and its transverse dimension decrease. The decrease in dimensions permits the glass sheet to slide off the slide bars 70, 72, and 74 during its bending and to move onto the upper shaping surface of the mold sections out of contact with the slide bars as the mold moves into its closed position and the glass sheet softens by exposure to heat.

The dimensions of the mold sections are so chosen that the edge of the curved glass sheet having a thickness on the order of ¼ inch (or a pair of sheets having a total thickness of ¼ inch) overlaps the substantially continuous frame defined by the mold sections by preferably not less than 1/16 inch nor more than ⅛ inch after bending. The purpose of this overlap is to permit the margin of the bent glass sheet to be surrounded by air instead of metal during the cooling phase that follows the glass bending operation. The maximum width permitted for the overlap is limited by the tendency of the glass to develop a reverse sag when the overlap exceeds ⅛ inch.

Contact with metal tends to slow the cooling rate of the glass, because of the relatively high thermal capacity of the metal. When the glass edge makes continuous contact with the metal while it is being cooled, the periphery of the glass cools more slowly than the portion it surrounds, thus tending to establish tension stresses in the bent glass sheet periphery. When the glass sheet periphery is exposed to air instead of metal during the cooling phase of the bending cycle, the periphery of the glass cools more quickly than the inboard portion contacting the metal mold, thereby tending to establish compression stresses in the bent glass sheet periphery. Therefore, it is very important that the slide bars 70, 72 and 74 be spaced from the mold rails 42, 45 and 46, respectively.

It is also important that the fingers 54 and 58 be located on the order of 1/16 inch outboard of rail 40 to support the side of the glass sheet overlying rail 40 to enable this side to overlap this latter rail the proper amount so that the entire margin of the bent glass sheet extends beyond the frame comprising the mold sections. Unless the flat glass sheet is loaded properly aligned onto the mold, the proper complex curvature accompanied by the proper edge stress pattern will not result.

It will be seen from FIGURE 4 that center section rail 42 is higher than center section rail 40 to support the flat glass sheet in a slightly oblique plane. In such position, one side edge is closer to overhead lehr heaters, thus promoting the glass to bend transversely toward said side edge. The mold rails should be so constructed that the flat glass sheet, if supported in an oblique plane, does not depart from the horizontal by an angle of more than 15 degrees, because the weight of the glass sheet resting upon the mold in an oblique position is likely to become distorted along its edge at the points of contact with support fingers 54 and 58.

From the description of the mold operation, it is inherent that the following criteria, based on the dimensions of the glass sheet to be bent, be employed in constructing the bending mold:

(1) The distance between the fingers 54 and 58, on one hand, and the center section rails 42, on the other hand, measured across the mold, must be less than the width of the bent glass sheet.

(2) The distance between the fingers 54 and 58, on one hand, and the laterally inner edge of slide bar 70, on the other hand, measured across the mold, must be less than the width of the flat glass sheet and greater than the width of the bent glass sheet.

(3) The distance between the fingers 54 and 58, on one hand, and the laterally outer edge of slide bar 70, on the other hand, measured across the mold, must be more than the width of the flat glass sheet.

If desired, the entire mold can be supported to pivot about the stub rods 29 which can be made pivotable about support brackets 28 as taught in application Serial No. 613,756 of Samuel F. Cox, Harold E. McKelvey and Thomas J. Reese for Bending Glass Sheets, filed October 3, 1956, now abandoned. This structure limits the duration of the exposure of the spaced support points along the glass edge to the support fingers at elevated temperatures under the pressure of the oblique component of the mass of the glass, thus lessening the likelihood and size of the distortions.

FIGURES 5, 6 and 7 show views similar to those of FIGURES 1, 2 and 3 for an alternate embodiment of the invention that has been found to be successful in commercial production. The bend required for this production pattern is slightly more complicated than the other because the windshield for this vehicle extends a considerable distance into the roof.

Figure 8:
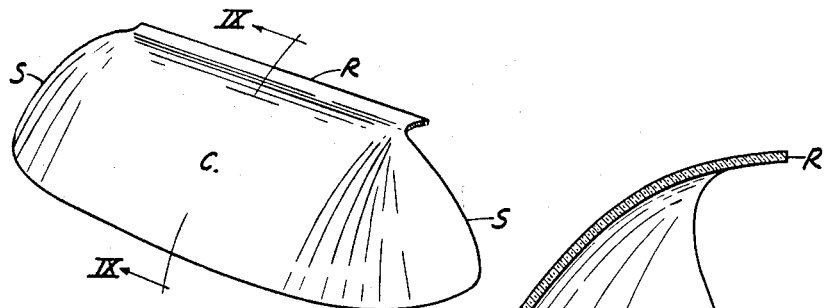
FIGURE 8 is a perspective view of a glass sheet bent on the structure shown in FIGURES 5, 6 and 7.
Figure 9:
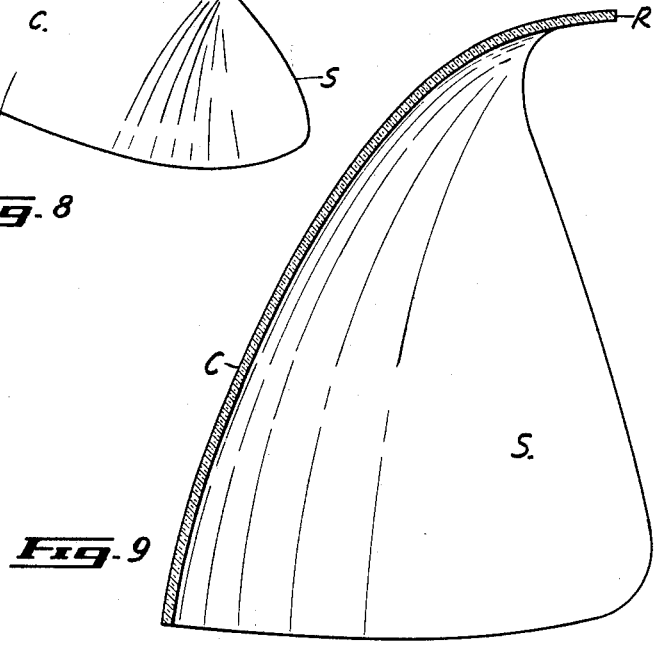
FIGURE 9 is a sectional view along the lines IX—IX of FIGURE 8.
Figure 10:
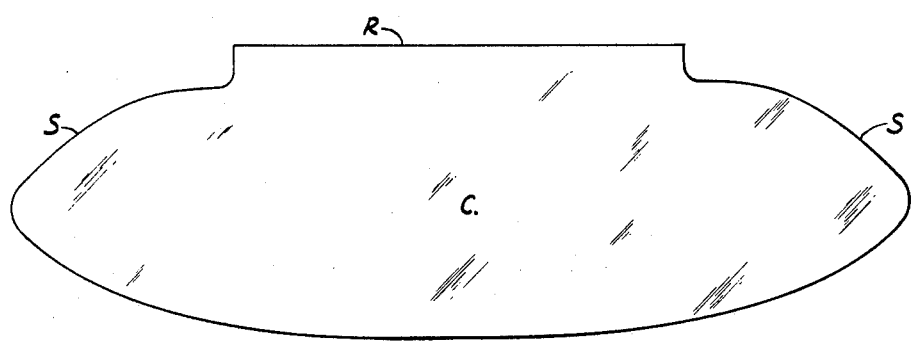
FIGURE 10 is a plan view of a flat glass sheet precut for bending on the mold of FIGURES 5, 6 and 7.

The structure of the glass sheet which forms part of the ultimate windshield is shown in FIGURES 8, 9 and 10. According to these drawings, the glass sheet comprises a center portion C terminating in tips S which are bent sharply relative to the central portion to extend rearwardly at the sides of the automobile and a side extension R which is curved transversely to extend into the vehicle roof.

The mold of this embodiment comprises a carriage frame 120 which includes longitudinally extending angle irons 122 interconnected by transverse angle irons 126. Support rods 130 are provided to support the mold structure in spaced relation above its supporting carriage. An intermediate beam 133 interconnects the transverse angle irons 126.

The mold includes a center mold section 139 comprising a smoothly curved longitudinally extending center section rail 140 and a reversely curved longitudinally extending center section rail 142, and end mold sections 143 and 144 comprising end section rails 145 and 146 pivoted relative to the central mold section 139 such as in the first embodiment. The reversely curved portion at each end of reversely curved rail 142 includes a portion extending laterally inward from its longitudinally extending main portion and an extremity portion extending longitudinally outward from said laterally inward portion and aligned with an inner extremity of one of the end mold sections.

Stub hinges 148 are attached to the center section rails 140 and 142. Formed metal straps 149, which are pivoted about stub hinges 148, interconnect lever arms 150 and 151 to the opposite side extremities of the end mold sections 143 and 144. Each lever arm 150 and 151 is counterweighted at 152 to provide a bending moment tending to close the mold.

Each mold section is reinforced with a reinforcing flange 160 at its bottom extremity for purposes similar to that of the reinforcing flange 60 of the previous embodiment.

Each of the metal straps 149 for lever arms 150 is provided with an extension 155 which is designed to make contact with a stop member 162 similar to one of the stop members 62 of the previous embodiment.

The central mold section is provided with a heat abstractor 164 comprising one or more metal plates 166 attached by means of support rods 167 to a longitudinally extending angle iron 122 or the intermediate beam 133 and includes an upper screen 168 having a peripheral portion overlapping the periphery of the metal plates for purposes described above in connection with the first embodiment for element 68.

At the outboard extremities of the mold section, additional heat abstractor plates 180 and 182 are provided. These latter plates are supported from the transverse angle irons 126 by means of a supporting structure shown generally as 186 including braces and support rods.

This embodiment requires that the transverse bend be localized and spaced a considerable distance inboard of the reversely curved portion delineated by center mold section rail 142. Therefore, the rail 142 is provided with a slide bar 170 that is spaced therefrom and completely surrounds the laterally outer edge of the latter and extends obliquely upwardly outwardly of the portion of the outline defined by the rail. The end mold sections 145 and 146 are provided with slide bars 172 and 174, respectively, which are spaced therefrom to embrace the latter and extend slightly beyond the mold extremities 176 and 178 respectively.

A guide 190 which comprises a bent rod 192 attached at its fixed end to a longitudinally extending angle iron 122 and including a ceramic sleeve extending upwardly from the free upturned portion 194 of the rod terminates in the plane of ultimate curvature desired for the transverse sag in the region of maximum sag. Thus, operators attending a bending lehr are able to observe when the transverse bend has been completed and are thus able to adjust the controls in the lehr accordingly in order to insure optimum bends.

What is claimed is:

1. Apparatus for bending flat glass sheets into compound curvatures including a longitudinal bend having a gently bent central portion merging into sharply bent regions to form longitudinal extremities sharply bent relative to said central portion and also including one longitudinally extending side of its central portion bent transversely relative to the gently bent central portion, said apparatus comprising a center mold section comprising a first center section rail extending longitudinally of said apparatus and a second center section rail extending longitudinally of said apparatus and laterally spaced from said first center section rail; each said center section rail having an upper shaping surface extending longitudinally thereof, said shaping surface having a transverse dimension extending from an upper, inner corner to an upper, outer corner of said rail, a slide bar, having an inner edge and an outer edge, attached to said first center section rail with its inner edge in laterally spaced relation to the upper, outer corner of said first center section rail, said slide bar being located laterally outwardly of said first center section rail on the side opposite that occupied by said second center section rail, said slide bar having an upper surface extending obliquely upwardly and outwardly from said inner edge to said outer edge, a pair of stops attached to said second center section rail in laterally spaced relation thereto and located laterally outwardly thereof on the side opposite that occupied by said first center section rail, an end mold section located longitudinally outwardly of each longitudinal extremity of said center mold section, each mold section having an upper shaping surface forming a continuation of the shaping surface at each end of each center section rail, hinge means pivotally connecting each end mold section to said center mold section for movement between a spread mold position and a closed mold position, the distance between said stops and said inner edge of said slide bar measured transversely of the mold being less than the transverse dimension of said flat glass sheets but greater than the corresponding transverse dimension of the glass sheets after bending, and the distance between each of said stops and said first center section rail measured transversely of the mold being less than said corresponding transverse dimension of the glass sheet after bending.

2. Apparatus as in claim 1, wherein said first center section rail has a longitudinally extending main portion and a reversely curved portion at each end, each said reversely curved portion including a portion extending laterally inward from said main portion and an extremity portion extending longitudinally outward from said laterally inward portion and aligned with an inner extremity of one of said end mold sections.

3. Apparatus as in claim 1, further including an additional slide bar attached to each end mold section in spaced relation thereto and having an upper surface extending beyond the longitudinal outer extremity of said end mold section.

4. Apparatus as in claim 3, wherein said first center section rail and said second center section rail have longitudinal extremities lying in a common plane and each said additional slide bar has a portion intersecting said common plane in the spread mold position, the straight distance between said latter portions in the spread mold position being substantially equal to the curved length of said apparatus in the closed mold position.

5. Apparatus as in claim 1, wherein said upper shaping surface of said first center section rail is at a slightly higher elevation than that of said second center section rail.

6. Apparatus for bending flat glass sheets comprising a center mold section comprising a first center section rail extending longitudinally of said apparatus with its longitudinal extremities lying in a common horizontal line and a second center section rail extending longitudinally of said apparatus with its longitudinal extremities lying in a common horizontal line and laterally spaced from said first center section rail, all said center section rail longitudinal extremities lying in a common plane, an end mold section located longitudinally outwardly of each longitudinal extremity of said center mold section, each mold section having an upper shaping surface, hinge means pivotally connecting each end mold section to said center mold section for movement between a spread mold position longitudinally spaced from said center mold section and a closed mold position in end-to-end relation with said center mold section, glass tip support means attached to each end mold section and having an upper surface located longitudinally outwardly and obliquely upwardly of said shaping surface of said end mold section, said upper surface having a portion intersecting said common plane in the spread mold position, the straight distance between said portions in the spread mold positions being substantially equal to the curved length of said apparatus in the closed mold position.

7. Apparatus as in claim 6, wherein the longitudinal extremities of said first center section rail is at a higher elevation than the longitudinal extremities of said second center section rail and a pair of stops are attached to said second center section rail in laterally spaced relation thereto and located laterally outwardly thereof on the side opposite that occupied by said first center section rail.

8. In a mold for bending glass sheets having a nonrectangular outline comprising a center mold section and an end mold section pivotally connected to each end of said center mold section, each end mold section having a pair of laterally spaced inner ends, said center mold section comprising a first center section rail having a longitudinally extending main portion and a reversely curved portion at each end, each said reversely curved portion including a portion extending laterally inward from said main portion and an extremity portion extending longitudinally outward from said laterally inward portion and aligned with an inner extremity of one of said end mold sections along one lateral side of said mold and a second smoothly shaped rail having its ends aligned with the other inner end of said end mold section.

(References on following page)

References Cited by the Examiner

UNITED STATES PATENTS

| | | | |
|---|---|---|---|
| 760,959 | 5/1904 | Cunnington | 65—158 |
| 2,057,763 | 10/1936 | Boyles et al. | 65—107 |
| 2,240,349 | 4/1941 | Preston | 65—107 |
| 2,608,030 | 8/1952 | Jendrisak | 65—287 |
| 2,682,730 | 7/1954 | Rossen | 65—268 X |
| 2,691,854 | 10/1954 | Rugg | 65—26 |
| 2,702,445 | 2/1955 | Jendrisak | 65—289 |
| 2,736,140 | 2/1956 | Black | 65—291 |
| 2,872,756 | 2/1959 | Jendrisak | 65—290 |
| 2,876,595 | 3/1959 | Golightly et al. | 65—288 |
| 2,893,170 | 7/1959 | Carson et al. | 65—107 |
| 2,920,423 | 1/1960 | Carson et al. | 65—290 |
| 2,977,720 | 4/1961 | Carson et al. | 65—288 |
| 2,999,338 | 9/1961 | Richardson | 65—289 X |
| 3,103,430 | 9/1963 | Jendrisak | 65—290 |
| 3,137,558 | 6/1964 | Oberstar | 65—288 |

FOREIGN PATENTS

| | | |
|---|---|---|
| 203,334 | 9/1956 | Australia. |
| 1,089,973 | 10/1954 | France. |

DONALL H. SYLVESTER, *Primary Examiner.*

MORRIS O. WOLK, F. W. MIGA,
*Assistant Examiners.*